United States Patent
Betz et al.

(10) Patent No.: US 9,443,054 B1
(45) Date of Patent: Sep. 13, 2016

(54) METHOD AND APPARATUS FOR UTILIZING CONSTRAINTS FOR THE ROUTING OF A DESIGN ON A PROGRAMMABLE LOGIC DEVICE

(71) Applicant: Altera Corporation, San Jose, CA (US)

(72) Inventors: Vaughn Betz, Toronto (CA); Caroline Pantofaru, Menlo Park, CA (US); Jordan Swartz, Toronto (CA)

(73) Assignee: Altera Corporation, San Jose, CA (US)

( * ) Notice: Subject to any disclaimer, the term of this patent is extended or adjusted under 35 U.S.C. 154(b) by 238 days.

(21) Appl. No.: 14/256,949

(22) Filed: Apr. 19, 2014

Related U.S. Application Data

(62) Division of application No. 13/861,628, filed on Apr. 12, 2013, now Pat. No. 8,745,566, which is a division of application No. 12/802,276, filed on Jun. 3, 2010, now Pat. No. 8,443,325, which is a division of application No. 10/447,554, filed on May 29, 2003, now Pat. No. 7,757,197.

(51) Int. Cl.
*G06F 17/50* (2006.01)

(52) U.S. Cl.
CPC ....... *G06F 17/5077* (2013.01); *G06F 17/5054* (2013.01)

(58) Field of Classification Search
CPC .................. G06F 17/5077; G06F 17/5054
See application file for complete search history.

(56) References Cited

U.S. PATENT DOCUMENTS

| | | | |
|---|---|---|---|
| 5,461,576 A | 10/1995 | Tsay et al. |
| 5,469,003 A | 11/1995 | Kean |
| 5,498,979 A | 3/1996 | Parlour et al. |
| 5,521,837 A | 5/1996 | Frankle et al. |
| 5,598,343 A | 1/1997 | Roy et al. |
| 5,602,406 A | 2/1997 | Okabe |
| 5,621,650 A | 4/1997 | Agrawal et al. |
| 5,659,484 A | 8/1997 | Bennett et al. |
| 5,689,195 A | 11/1997 | Cliff et al. |
| 5,696,771 A | 12/1997 | Beausang et al. |
| 5,703,789 A | 12/1997 | Beausang et al. |
| 5,801,546 A | 9/1998 | Pierce et al. |
| 5,821,776 A | 10/1998 | McGowan |
| 5,828,579 A | 10/1998 | Beausang |
| 5,831,868 A | 11/1998 | Beausang et al. |
| 5,867,396 A | 2/1999 | Parlour |
| 5,900,743 A | 5/1999 | McClintock et al. |
| 5,903,466 A | 5/1999 | Beausang et al. |
| 5,903,886 A | 5/1999 | Heimlich et al. |
| 5,963,051 A | 10/1999 | Cliff et al. |
| 6,006,024 A | 12/1999 | Guruswamy et al. |
| 6,058,252 A | 5/2000 | Noll et al. |
| 6,083,271 A | 7/2000 | Morgan |
| 6,086,631 A | 7/2000 | Chaudhary et al. |
| 6,145,117 A | 11/2000 | Eng |
| 6,167,558 A | 12/2000 | Trimberger |
| 6,182,247 B1 | 1/2001 | Herrmann et al. |
| 6,188,242 B1 | 2/2001 | Mahajan et al. |
| 6,311,317 B1 | 10/2001 | Khoche et al. |
| 6,360,356 B1 | 3/2002 | Eng |
| 6,378,123 B1 | 4/2002 | Dupenloup |

(Continued)

*Primary Examiner* — Naum B Levin
(74) *Attorney, Agent, or Firm* — L. Cho

(57) ABSTRACT

A method for designing a system on a programmable logic device (PLD) is disclosed. Routing resources are selected for a user specified signal on the PLD in response to user specified routing constraints. Routing resources are selected for a non-user specified signal on the PLD without utilizing the user specified routing constraints.

20 Claims, 7 Drawing Sheets

(56) References Cited

U.S. PATENT DOCUMENTS

| | | | |
|---|---|---|---|
| 6,442,745 B1 | 8/2002 | Arunachalam et al. | |
| 6,446,239 B1 | 9/2002 | Markosian et al. | |
| 6,477,683 B1 | 11/2002 | Killian et al. | |
| 6,496,972 B1 | 12/2002 | Segal | |
| 6,510,546 B1 | 1/2003 | Blodget | |
| 6,516,456 B1 | 2/2003 | Garnett et al. | |
| 6,526,559 B2 | 2/2003 | Schiefele et al. | |
| 6,539,536 B1 | 3/2003 | Singh et al. | |
| 6,578,176 B1 | 6/2003 | Wang et al. | |
| 6,587,981 B1 | 7/2003 | Muradali et al. | |
| 6,631,510 B1 | 10/2003 | Betz et al. | |
| 6,651,238 B1 | 11/2003 | Wells et al. | |
| 6,691,301 B2 | 2/2004 | Bowen | |
| 6,693,456 B2 | 2/2004 | Wong | |
| 6,763,506 B1 | 7/2004 | Betz et al. | |
| 6,779,169 B1 | 8/2004 | Singh et al. | |
| 6,817,005 B2 | 11/2004 | Mason et al. | |
| 6,857,110 B1 | 2/2005 | Rupp et al. | |
| 6,871,328 B1 * | 3/2005 | Fung | G06F 17/5054 |
| | | | 716/113 |
| 6,877,040 B1 | 4/2005 | Nam et al. | |
| 6,937,064 B1 | 8/2005 | Lewis et al. | |
| 6,957,412 B1 | 10/2005 | Betz et al. | |
| 6,964,027 B2 | 11/2005 | Kucukcakar et al. | |
| 7,017,138 B2 | 3/2006 | Zirojevic et al. | |
| 7,076,751 B1 | 7/2006 | Nixon et al. | |
| 7,194,720 B1 | 3/2007 | Borer et al. | |
| 7,219,314 B1 | 5/2007 | Trimberger et al. | |
| 7,757,197 B1 | 7/2010 | Betz et al. | |
| 8,443,325 B1 | 5/2013 | Betz et al. | |
| 8,745,566 B1 | 6/2014 | Betz et al. | |
| 2001/0047509 A1 | 11/2001 | Mason et al. | |
| 2002/0103943 A1 | 8/2002 | Lo et al. | |
| 2003/0033588 A1 | 2/2003 | Alexander | |
| 2005/0034094 A1 | 2/2005 | Madurawe | |

* cited by examiner

| Line number in routing constraints file | Routing constraints (Contents of routing constraints file) |
|---|---|
| 1 | signal_name = mydesign\|handshake { |
| 2 | label = le_output, LEB:X2Y3S0I1 \|\| LEB:X2Y3S0I0 ; # Use either LE output |
| 3 | H4:X1Y3S0I88 ; |
| 4 | V4:* ;    # Use any V4 wire |
| 5 | zero_or_more, H4:*; #Use 0 or more H4 wires. |
| 6 | LL:X4Y6S0I23 ; |
| 7 | dest = (mydesign\|mult, DATAA), route_port = DATAD;   # First destination. |
| 8 | |
| 9 | branch_point = le_output;   # Start point of next routing branch is<br>          #whichever LE output was used to route to the first destination. |
| 10 | V8:X2Y1* \|\| H4:*Y3*; |
| 11 | *;    # Use any wire. |
| 12 | H4:X1-3Y2* ; |
| 13 | LL:*; |
| 14 | dest = (mydesign\|add, DATAB);   # Second destination. |
| 15 | |
| 16 | LEB:*;   #Start point of the next routing branch is a different LE output<br>          #than used in the previous two connections. |
| 17 | zero_or_more, *; #Use 0 or more of any combination of wires. |
| 18 | dest = (mydesign\|add2, DATAC);   # Third destination. |
| 19 | } |

FIG. 6

METHOD AND APPARATUS FOR UTILIZING CONSTRAINTS FOR THE ROUTING OF A DESIGN ON A PROGRAMMABLE LOGIC DEVICE

RELATED APPLICATIONS

This application is a divisional of and claims priority and benefit to U.S. application Ser. No. 13/861,628 filed on Apr. 12, 2013, entitled, "Method and Apparatus for Utilizing Constraints for the Routing of a Design on a Programmable Logic Device", which claims priority and benefit to U.S. Pat. No. 8,443,325 filed on Jun. 3, 2010, entitled "Method and Apparatus for Utilizing Constraints for the Routing of a Design on a Programmable Logic Device", which claims priority and benefit to U.S. Pat. No. 7,757,197, filed on May 29, 2003, entitled, "Method and Apparatus for Utilizing Constraint for the Routing of a Design on a Programmable Logic Device".

FIELD OF THE INVENTION

The present invention relates to programmable logic devices (PLDs). More specifically, the present invention relates to a method and apparatus for specifying and enforcing constraints on the routing of designs in PLDs. These constraints may be used by tools for designing systems on PLDs such as electronic design automation (EDA) tools.

BACKGROUND

PLDs may be used to implement large systems that include millions of gates and megabits of embedded memory. Of the tasks required in managing and optimizing design, routing connections between components on the PLD utilizing available routing resources can be among the most challenging and time consuming. The complexity of large systems often requires the use of EDA tools to manage and optimize their design onto physical target devices. Automated routing algorithms in EDA tools perform the time-consuming task of routing connections between components on the physical devices.

Standard automated routing algorithms available in off the shelf EDA tools may be incapable of routing connections between components on the PLD with the available routing resources on the PLD. Alternatively, standard algorithms may be unable to route some connections such that the connections are fast enough to meet the design performance target. In some instances, manual routing techniques are more efficient in identifying routing strategies that automated algorithms are slow to or even sometimes unable to identify. Some EDA tools allow users to manually select routing resources for making connections. Many of these EDA tools, however, require that the user identify the specific routing resources for making the connections. Many of these EDA tools also require that once the user wishes to specify a routing resource to be used for making one connection that the user specify each and every routing resource to be used for making all the connections constituting a given signal, or even all the connections in the entire design. Although these options may offer the user some flexibility, the EDA tools require the user to input a large amount of information which may be time-consuming and subject to inputting errors.

Thus, what is needed is an efficient and effective method and apparatus for allowing user-specified routing constraints to be specified and enforced.

SUMMARY

A method and apparatus for utilizing constraints for the routing of a design on a PLD is disclosed. According to an embodiment of the present invention, routing constraints may be specified with multiple levels of abstractions. For example, routing constraints may identify specific routing resources to be utilized such that a router does not have any flexibility. The routing constraints may also include a general description of routing resources to be utilized or include partial route specifications such that the router has some flexibility. This approach is an improvement over the functionalities provided by existing EDA tools where specific routing resources needed to be identified, and where each and every connection on a signal, or every connection in the design needed to be specified.

BRIEF DESCRIPTION OF THE DRAWINGS

The features and advantages of the present invention are illustrated by way of example and are by no means intended to limit the scope of the present invention to the particular embodiments shown, and in which:

FIG. 6 illustrates the format of an exemplary routing constraints file according to an embodiment of the present invention.

DETAILED DESCRIPTION

Figure 1:
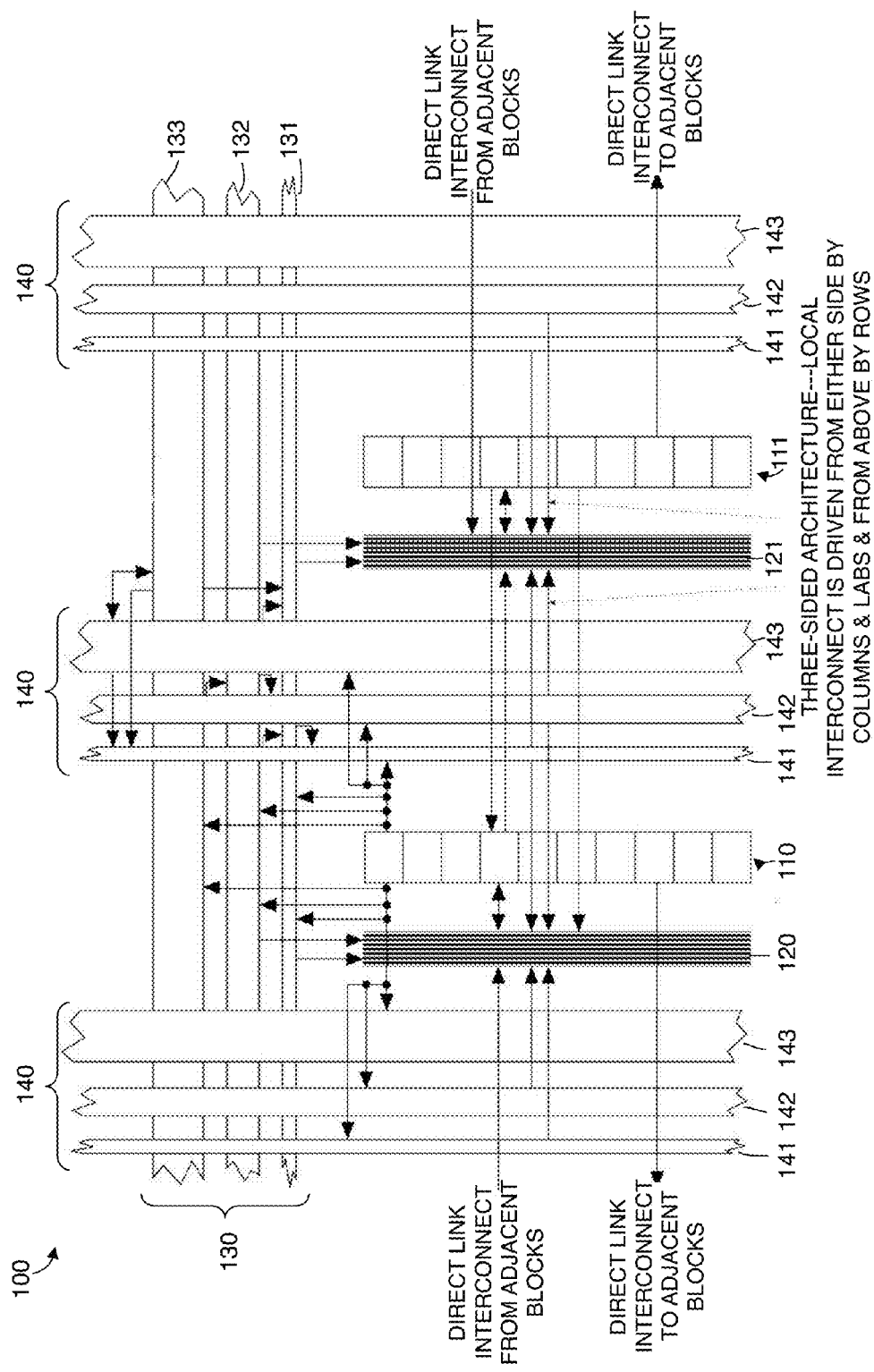
FIG. 1 illustrates a target device utilizing PLDs according to an embodiment of the present invention.

FIG. 1 illustrates an exemplary target device 100 utilizing PLDs according to an embodiment of the present invention. The present invention may be used to design a system onto the target device 100. According to one embodiment, the target device 100 is a chip having a hierarchical structure that may take advantage of wiring locality properties of circuits formed therein. The lowest level of the hierarchy is a logic element (LE) (not shown). An LE is a small unit of logic providing efficient implementation of user logic functions. According to one embodiment of the target device 100, an LE may include a 4-input lookup table (LUT) with a configurable flip-flop.

The target device 100 includes a plurality of logic-array blocks (LABs). Each LAB is formed from 10 LEs, LE carry chains, LAB control signals, LUT chain, and register chain connection lines. LUT chain connections transfer the output of one LE's LUT to the adjacent LE for fast sequential LUT connections within the same LAB. Register chain connection lines transfer the output of one LE's register to the adjacent LE's register within a LAB. LABs are grouped into rows and columns across the target device 100. A first column of LABs is shown as 110 and a second column of LABs is shown as 111.

The target device 100 includes memory blocks (not shown). The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 100.

The target device 100 includes digital signal processing (DSP) blocks (not shown). The DSP blocks may be used to implement multipliers of various configurations with add or subtract features. The DSP blocks include shift registers, multipliers, adders, and accumulators. The DSP blocks may be grouped into columns across the target device 100.

The target device 100 includes a plurality of input/output elements (IOEs) (not shown). Each IOE feeds an I/O pin (not shown) on the target device 100. The IOEs are located at the end of LAB rows and columns around the periphery of the target device 100. Each IOE includes a bidirectional I/O buffer and a plurality of registers for registering input, output, and output-enable signals. When used with dedicated clocks, the registers provide performance and interface support with external memory devices.

The target device 100 includes LAB local interconnect lines 120-121 that transfer signals between LEs in the same LAB. The LAB local interconnect lines are driven by column and row interconnects and LE outputs within the same LAB. Neighboring LABs, memory blocks, or DSP blocks may also drive the LAB local interconnect lines 120-121 through direct link connections.

The target device 100 also includes a plurality of row interconnect lines ("H-type wires") 130 that span fixed distances. Dedicated row interconnect lines 130, that include H4 131, H8 132, and H24 133 interconnects, route signals to and from LABs, DSP blocks, and memory blocks within the same row. The H4 131, H8 132, and H2 133 interconnects span a distance of up to four, eight, and twenty-four LABs respectively, and are used for fast row connections in a four-LAB, eight-LAB, and twenty-four-LAB region. The row interconnects 130 may drive and be driven by LABs, DSP blocks, RAM blocks, and horizontal IOEs.

The target device 100 also includes a plurality of column interconnect lines ("V-type wires") 140 that operate similarly to the row interconnect lines 130. The column interconnect lines 140 vertically routes signals to and from LABs, memory blocks, DSP blocks, and IOEs. Each column of LABs is served by a dedicated column interconnect, which vertically routes signals to and from LABs, memory blocks, DSP blocks, and IOEs. These column interconnect lines 140 include V4 141, V8 142, and V16 143 interconnects that traverse a distance of four, eight, and sixteen blocks respectively, in a vertical direction.

FIG. 1 illustrates an exemplary embodiment of a target device. It should be appreciated that a system may include a plurality of target devices, such as that illustrated in FIG. 1, cascaded together. It should also be appreciated that the target device may include programmable logic devices arranged in a manner different than that on the target device 100. A target device may also include components other than those described in reference to the target device 100. Thus, while the invention described herein may be utilized on the architecture described in FIG. 1, it should be appreciated that it may also be utilized on different architectures, such as those employed by Altera® Corporation in its APEX™, and Mercury™ family of chips and those employed by Xilinx®, Inc. in its Virtex™ and Virtex™ II line of chips.

Figure 2:
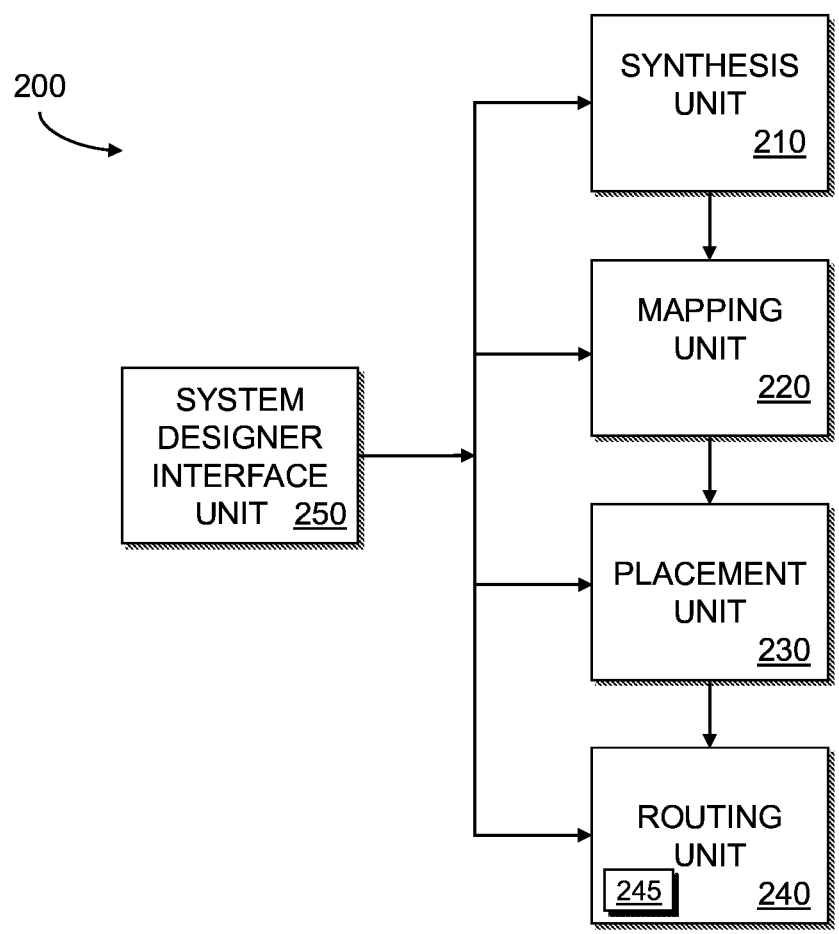
FIG. 2 illustrates an EDA tool according to an embodiment of the present invention.

FIG. 2 illustrates a system designer 200 according to an embodiment of the present invention. The system designer 200 may be an EDA tool. FIG. 2 illustrates software modules implementing an embodiment of the present invention. According to one embodiment, system design may be performed by a computer system (not shown) executing sequences of instructions represented by the software modules shown in FIG. 2. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software.

Block 210 represents a synthesis unit. The synthesis unit 210 generates a logic design of a system to be implemented by the target device 100 (shown in FIG. 1). According to an embodiment of the system designer 200, the synthesis unit 210 takes a conceptual Hardware Description Language (HDL) design definition and generates an optimized logical representation of the system. The optimized logical representation of the system generated by the synthesis unit 210 may include a representation that has a minimized number of logic gates and logic elements required for the system. Alternatively, the optimized logical representation of the system generated by the synthesis unit 210 may include a representation that has a reduced depth of logic and that generates a lower signal propagation delay.

Block 220 represents a mapping unit 220. The mapping unit 220 determines how to implement the logic gates and logic elements in the optimized logic representation utilizing specific resources on the target device 100. According to an embodiment of the system designer 200, the mapping unit 220 generates a netlist. The netlist illustrates how the resources on the target device 100 are utilized to implement the system. The netlist may, for example, represent components such as LEs on the target device 100.

Block 230 represents a placement unit 230. The placement unit 230 fits the system on the target device 100 by determining which resources on the target device 100 is to be used for specific logic elements and other function blocks. According to an embodiment of the system designer 200, the placement unit 230 first determines how to implement portions of the optimized logic design in clusters. Clusters may represent a subset of the components on the target device 100 such as, for example, a LAB having 10 LEs. In this embodiment, after portions of the optimized logic design are implemented in clusters, the clusters may be placed by assigning the clusters to specific LABs on the target device 100. Following the placement of the clusters, routing interconnections between the LEs may be performed. The placement unit 230 may utilize a cost function in order to determine an optimal assignment of resources on the target device 100.

Block 240 represents a routing unit 240. The routing unit 240 determines the routing resources on the target device 100 to use to provide interconnection between the logic gates and logic elements on the target device 100.

Block 250 represents a system designer interface. The system designer interface 250 allows a user to interact with modules of the system designer 200. The user may input user specified constraints to modules of the system designer 200. The user specified constraints may be directed, for example, to the routing of a system on the target device 100. According to an embodiment of the present invention, the user specified routing constraints may be directed to user selected signals or nets, user selected connections corresponding to user selected nets, and user selected segments or route steps of user selected connections on the target device 100. The user specified routing constraints may describe routing resources required to be used to route the selected connections. For example, the user specified routing constraints may identify a specific routing resource that is to be used or generally describe a category or type of routing resource to be used for routing.

The user specified routing constraint may be written into a routing constraints file that includes a list of nets and the constraints for each net. Each constrained net may have constraints for any number of its connections and any number of its segments on a connection. The constraint may be a list of routing resource choices available at a current routing step for routing a segment of the connection. The constraint ends in a block and input port to which the connection is to be routed. An example of a portion of a routing constraint file is shown below.

```
<net name>
    <routing resource choice 1> [|| <routing resource choice 2> [...]]    (step 1)
    <routing resource choice 1> [|| <routing resource choice 2> [...]]    (step 2)
    <destination block name and input port>           (end of connection 1)
    <routing resource choice 1> [|| <routing resource choice 2> [...]]    (step 3)
    <destination block name and input port>           (end of connection 2)
```

In this example, each routing resource choice includes a routing resource type name and a location on the device in use. The system designer interface 250 may give the user flexibility in specifying routing resources by the use of wildcarding. Wildcarding may be used for an entire routing resource choice to allow a router in the routing unit 240 to examine all routing resources at the route step. Wildcarding may also be used for one or more of the location parameters of a routing resource choice to allow the routing unit 240 to examine a subset of the routing resources available at the route step. According to an embodiment of the system designer interface 250, a modifier may be utilized to allow a user to specify partial routes in the routing constraints file. The modifier may be used to indicate that a specific routing constraint should be ignored for a specified route step or that a specific routing constraint may be used as many times as required to complete a route.

According to an embodiment of the system designer 200, the routing unit 240 includes a constraint processor 245. The constraint processor 245 interfaces with the system interface 250 to process the user specified routing constraint provided. The constraint processor 245 integrates the user specified routing constraints provided with the routing procedure performed by the routing unit 240. This allows the routing unit 240 to utilize user specified routing constraints to route user specified signals, connections, and segments of connections while giving the routing unit 240 flexibility to utilize its own routing algorithm to route non-user specified signals, connections, and segments of connections.

Figure 3:
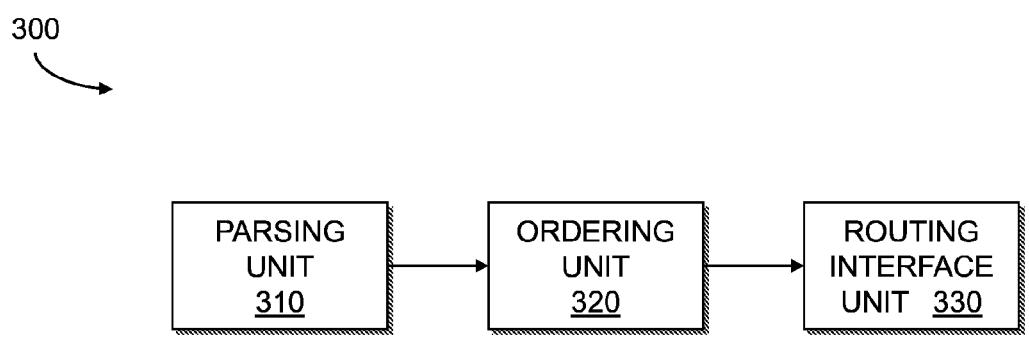
FIG. 3 illustrates a router according to an embodiment of the present invention.

FIG. 3 is a block diagram illustrating an embodiment of a constraint processor 300 according to an embodiment of the present invention. The constraint processor 300 may be used to implement the constraint processor 245 illustrated in FIG. 2. The constraint processor 300 includes a parsing unit 310. The parsing unit 310 receives the routing constraints provided for the design of a system on the target device 100 (shown in FIG. 1). The parsing unit 310 compares the names of routing resources, sources, and sinks in the routing constraints with that of known routing resources and components on the target device 100 and in the system. The parsing unit 310 may identify a routing constraint that includes a reference to a routing resource or component that does not exist and appears to be erroneous. The parsing unit 310 discards these routing constraints from consideration.

The constraint processor 300 includes an ordering unit 320. The ordering unit 300 receives the routing constraints to be considered from the parsing unit 310. The ordering unit 300 determines an order in which the nets in the system are to be routed on the target device 100. The nets are ordered such that the nets having routing constraints are placed earlier in the order so that they are routed before nets not having routing constraints. The ordering unit 300 also determines an order in which connections in a net are to be routed on the target device 100. The connections are ordered such that the connections having routing constraints are placed earlier in the order so that they are routed before connections not having routing constraints. It should be appreciated that other considerations may be used to further order the nets and connections to be routed.

The constraint processor 300 includes a routing interface unit 330. The routing interface unit 330 presents the order in which the nets and connections associated with the nets are to be routed to a router (not shown) in the routing unit 240 (shown in FIG. 2). The routing interface unit 330 also presents the routing constraints associated with each net, connection, and/or segment to the router such that the router can integrate the constraints with a routing procedure used.

It should be appreciated that the synthesis unit 210, mapping unit 220, placement unit 230, routing unit 240, and system design interface 250 in FIG. 2 and the parsing unit 310, ordering unit 320, and routing interface unit 330 in FIG. 3 may be implemented using any known circuitry or technique. It should also be appreciated that not all the components shown in FIGS. 2 and 3 may be required to practice the present invention.

Figure 4:
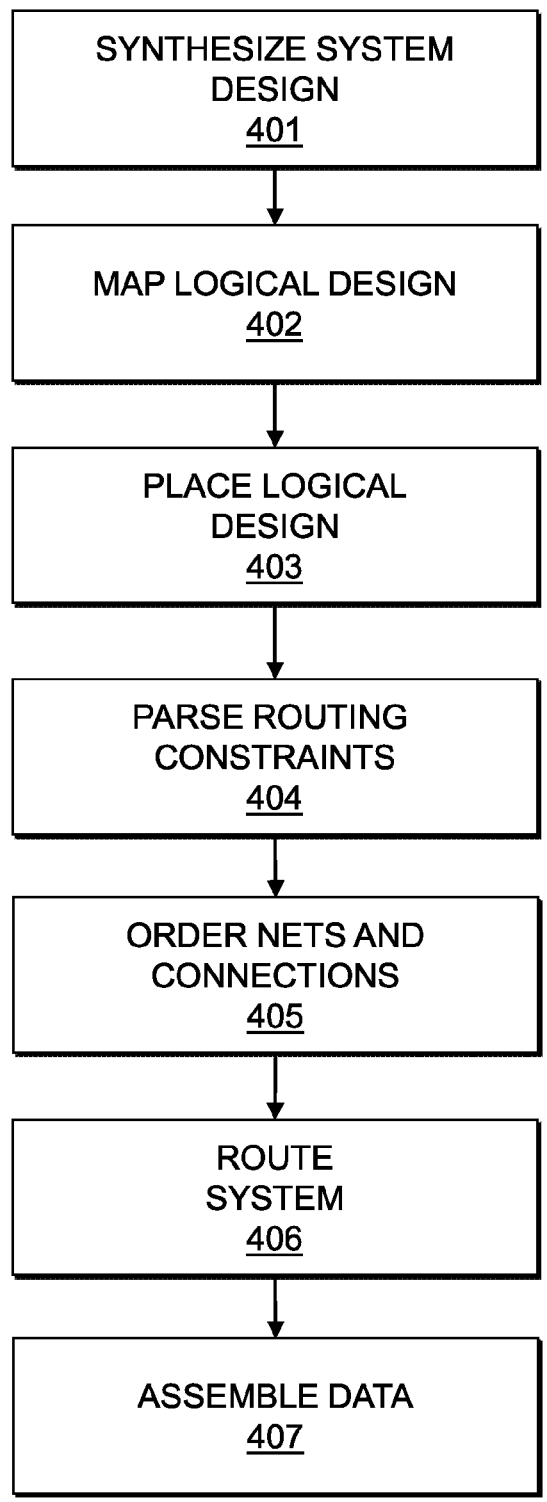
FIG. 4 is a flow chart illustrating a method for designing a system on a PLD according to an embodiment of the present invention.

FIG. 4 is a flow chart illustrating a method for designing a system on a PLD according to an embodiment of the present invention. At 401, the system is synthesized. Synthesis includes generating a logic design of the system to be implemented by a target device. According to an embodiment of the present invention, synthesis generates an optimized logical representation of the system from a HDL design definition.

At 402, the optimized logical design of the system is mapped. Mapping includes determining how to implement logic gates and logic elements in the optimized logic representation with specific resources on the target device. According to an embodiment of the present invention, a netlist is generated from mapping.

At 403, the mapped logical system design is placed. According to an embodiment of the present invention, placement includes fitting the system on the target device by determining which resources on the target device is to be used for specific logic elements, other function blocks, and connections between the logic elements and the other function blocks.

At 404, routing constraints for the system are parsed. According to an embodiment of the present invention, routing resources and components identified in the routing constraints are compared with known routing resources and components in the system and on the target device. Routing resources and components that are not recognized are discarded from consideration.

At 405, an order in which the nets and connections in the system are to be routed on the target device is determined. According to an embodiment of the present invention, the nets are ordered such that the nets having routing constraints are placed earlier in the order so that they are ordered before nets not having routing constraints. In this embodiment, the connections are ordered such that the connections having routing constraints are placed earlier in the order so that they are ordered before connections not having routing constraints.

At 406, routing is determined for the signals, connections, and segments on the system. The routing is performed in response to the routing constraints provided At 407, an assembly procedure is performed. The assembly procedure involves creating a data file that includes information determined by the fitting procedure. The data file may be a bit stream that may be used to program the target device.

Figure 5:
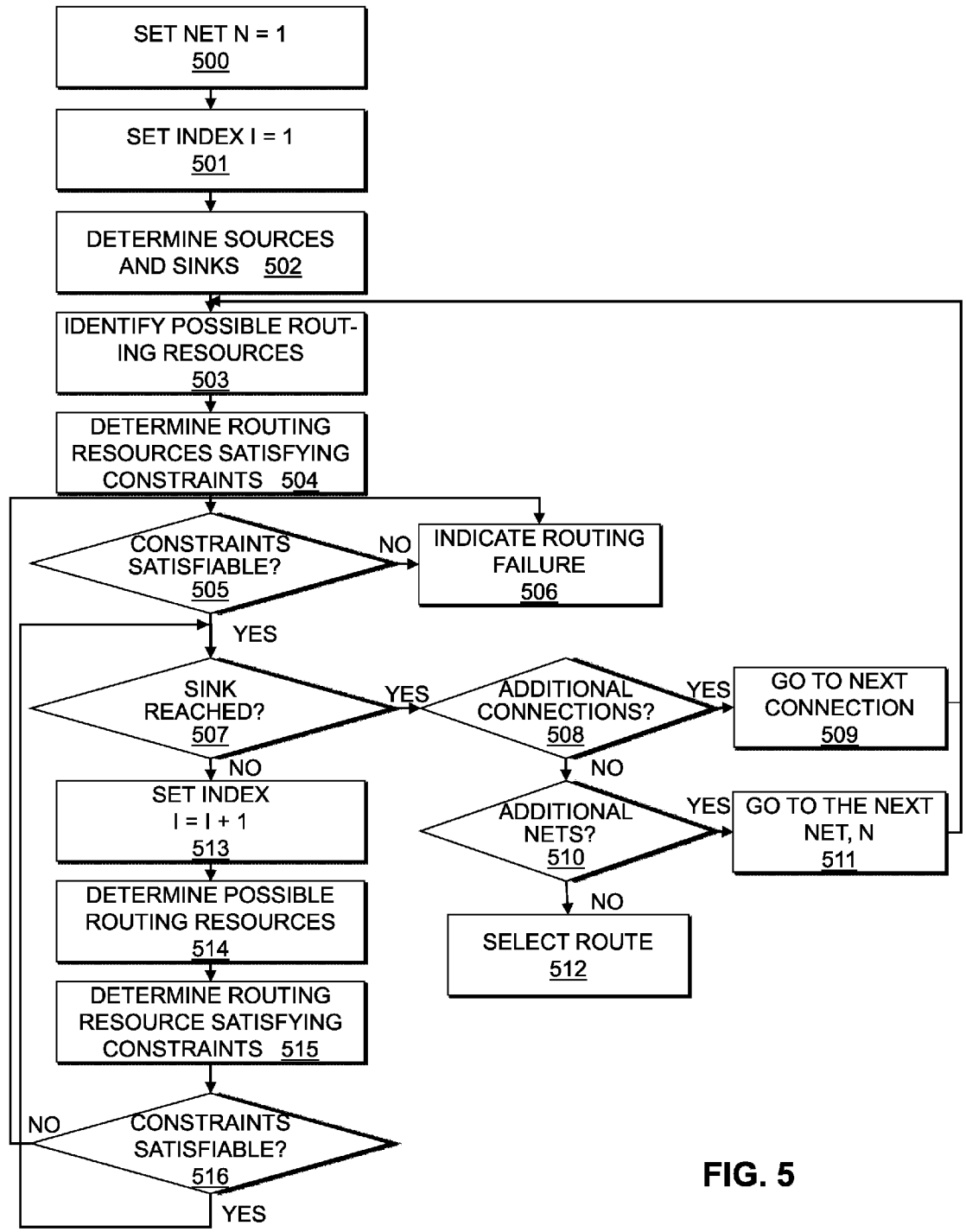
FIG. 5 is a flow chart illustrating a method for performing routing on a PLD according to an embodiment of the present invention.

FIG. 5 is a flow chart illustrating a method for performing routing according to an embodiment of the present invention. The method described in FIG. 5 may be used to implement block 406 shown in FIG. 4. At 500, the net, n, is set to the first net, 1.

At 501, index i is set to 1.

At 502, the source and sinks are determined for net n. According to an embodiment of the present invention, a source represents a start point for a net or connection on the target device. A sink represents an end or destination point for a net or connection on the device.

At 503, for the current connection on the current net, all possible routing resources that may be used to route from the source are identified. The identified routing resources may be included in a list referred to as "routing wires for segment i".

At 504, the identified routing resources in the routing wires for segment i list that satisfy the routing constraints for the system are determined. The routing wires for segment i list is updated to include only the routing resources that satisfy the routing constraints. The routing resources in the routing wires for segment i list are potential segments on the connection.

At 505, if none of the identified routing resources in the routing wires for segment i list satisfies the constraints for the system, control proceed to 506. If at least one of the identified routing resources in the routing wires for segment i list satisfies the constraints for the system, control proceeds to 507.

At 506, an indication is generated that there is a routing failure. Alternatively, a procedure which updates the routing constraints to remove the impossible constraint just found could be called. After updating the routing constraints, control would return to step 501 to retry the routing.

At 507, it is determined whether a sink for the connection has been reached from each of the identified routing resources in the routing wires for segment i list. If a sink for the connection has been reached, control proceeds to 508. If a sink for the connection has not been reached, control proceeds to 513.

At 508, it is determined whether additional connections are to be routed for the current net. If additional connections are to be routed, control proceeds to 509. If additional connections are not to be routed, control proceeds to 510.

At 509, control prepares to route the next connection. Control proceeds to 503.

At 510, it is determined whether additional nets are to be routed. If additional nets are to be routed, control proceeds to 511. If additional nets are not to be routed, control proceeds to 512.

At 511, control goes to the source of the next net and prepares the route the first connection in the next net. Net n is set to n+1. Control proceeds to 501.

At 512, a route is selected for the connection. According to an embodiment of the present invention, if a plurality of routed paths that connect the source to the sink is available, the path that provides the shortest path, that utilizes routing resources having the smallest cost function value that yields the smallest delay, or that satisfies some other criteria is selected to be the routed path for the connection. If no routed path is available to select from, a routing failure is indicated.

At 513, index i is set to i+1

At 514, for the current identified routing resource in the connection, all possible routing resources that may be used to route from the identified routing resource are determined. The identified routing resources may be included in a list referred to as "routing wires for segment i".

At 515, the identified routing resources in the routing wires list for segment i that satisfy the routing constraints for the system are determined. The routing wires list for segment i is updated to include only the routing resources that satisfy the routing constraints. The routing resources in the routing wires list for segment i are potential segments on the connection.

At 516, if none of the identified routing resources in the routing wire list satisfies the constraints for the system, control proceed to 506. If at least one of the identified routing resources in the routing wire list satisfies the constraints for the system, control proceeds to 507.

According to an alternate embodiment of the present invention, not all routing resources in the routing wires for segment i list need to be considered as shown in 507-516. For example, if one routing resource satisfies the constraints for the system and that routing resource is directed towards the sink for the connection, that routing resource will be considered the primary candidate for that segment of the connection. The other routing resources in the routing wires for segment i list (additional potential segments) may be considered in the future if the primary candidate is unable to find a path to the sink that satisfies the constraints of the system.

FIGS. 4 and 5 are flow charts illustrating a method for designing a system on a PLD, and a method for performing routing respectively. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention (e.g. exemplary process described with respect to FIGS. 4 and 5) may be provided as a computer program product, or software, that may include a machine-readable medium having stored thereon instructions. The machine-readable medium may be used to program a computer system or other electronic device. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions.

FIG. 6 illustrates the format of an exemplary routing constraint file according to an embodiment of the present invention. In this example, three connections are routed from a net. Lines 1-7 describe routing constraints for a first connection on the net. At line 1, the name of the net (signal) to which the following constraints apply is provided. Line 2 specifies that the routing of this net is to start on one of two LE output pins, both of which are at coordinates x=2, y=3, sub_location=0. Line 3 specifies that the routing step after the LE output must specifically use the H4-type wire at x=1, y=3, sub_location=0, index=88. Line 4 indicates that at the next routing step a V4-type wire must be used. The V4-type wire may be any V4-type wire reachable from the H4 wire at 1, 3, 0, 88. At line 5, the keyword "zero_or_more" is used. This means that the router can use zero, one, or multiple occurrences of the following routing resource, in this case any H4. Line 6 indicates that the LAB interconnect line at 4, 6, 0, 23 must be used at the next routing step. Line 7 lists the name of the cell to which the first connection is to be routed to, the name of the port on the cell that to which this signal is connected in the netlist, and the name of the port that should be used in the routing.

Lines 9-14 describe routing constraints for a second connection of the net. Line 9 specifies that the start point for this new "branch" of the routing should be the LE output node which was chosen by the router in routing the first connection. Line 10 indicates that any V8 at x=2, y=1 or any H4 at y=3 may be used. At line 11, the term "*" is used. This indicates that any type of wire, anywhere in the chip, can be used for the next routing step. Line 12 indicates the next routing step can use any H4 line with y=2, and x between 1 and 3. Line 13 indicates that any LAB interconnect line can be used at the next routing step. Line 14 lists the destination of the second connection.

Lines 16-18 describe the routing constraints for a third connection of the net. Line 16 indicates that the fanout can come from any LE output other than the LE output used by the previous two fanouts. Line 17 indicates that the router may use zero, one, or more of any type of routing resource. Line 18 lists the destination for the third connection.

Figure 7:
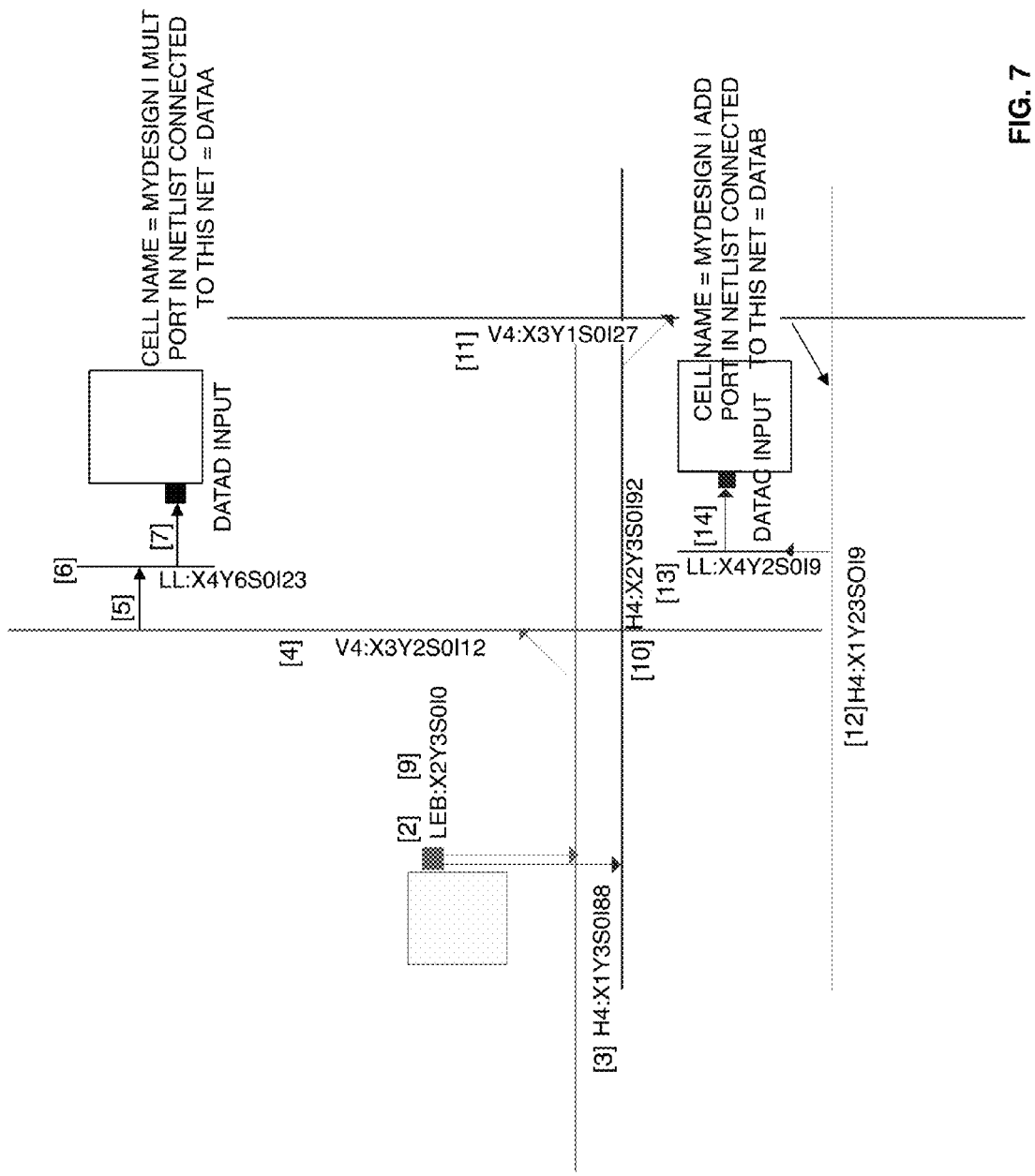
FIG. 7 illustrates how an EDA tool performs constrained routing according to an embodiment of the present invention.

FIG. 7 illustrates how an EDA tool performs constrained routing according to an embodiment of the present invention. The routing of the first two connections described with reference to lines 1-7 and 9-14 of FIG. 6 is shown. For the first connection, pursuant to the constraint on line 2, the router is given the choice of using one of two input pins. X2Y3 S0I0 is chosen and is labeled as [2]. Pursuant to the constraint on line 3, the router is next required to route with wire H4 X1Y3S0I88. This is labeled as [3]. Pursuant to the constraint on line 4, the router is next required to route using any V4. V4 X3Y2S0I12 is chosen and is labeled as [4]. Pursuant to the constraint on line 5, the router is next required to route with zero or more H4-type wires. This is labeled as [5]. Pursuant to line 6, the router is next required to route to lab line X4Y6S0I23 and is labeled as [6]. Pursuant to line 7, the router is next required to route to mydesign|mult, at port datad. This is labeled as [7].

For the second connection, pursuant to the constraint on line 9, the branch point begins at the same point as the first connection as labeled as [9]. Pursuant to the constraint on line 10, the router is next required to route with any V8-type wire at x=2, y=1, or any H4 at y=3. H4 X2Y3S0I92 is chosen and is labeled as [10]. Pursuant to the constraint on line 11, the router is next required to use any type of wire. One is selected and is labeled as [11]. Pursuant to the constraint on line 12, the router is next required to use any H4-type wire at y=2 and x between 1 and 3. H4 X1Y23S0I9 is chosen and this is labeled as [12]. Pursuant to the constraint on line 13, the router is next required to use any LAB interconnect line. LAB interconnect line X4Y2S0I9 is chosen and is labeled as [13]. Pursuant to the constraint on line 14, the router is next required to route to mydesign|add. This is labeled as [14].

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for designing a system on a target device, comprising:
    selecting routing resources for a user specified segment on a target device in response to user specified routing constraints specifying one of a specific wire and a category of wires on the target device; and
    selecting routing resources for a non-user specified segment on the target device without utilizing the user specified routing constraints, wherein at least one of the selecting is performed by a processor.

2. The method of claim 1, further comprising generating a routing constraints file that includes user specified routing constraints for routing a system on the target device.

3. The method of claim 1, wherein selecting routing resources for the user specified segments comprises ordering segments such that segments having user-specified routing constraints are routed before segments not having user-specified routing constraints.

4. The method of claim 1, further comprising identifying erroneous user-specified routing constraints.

5. The method of claim 4, further comprising discarding identified erroneous user-specified routing constraints from consideration prior to selecting routing resources.

6. The method of claim 1, wherein the category of wires describe an orientation of wires.

7. The method of claim 1, wherein the category of wires describe a length of wires.

8. The method of claim 1, wherein the target device is a field programmable gate array (FPGA).

9. A system designer, comprising:
    a routing unit that selects routing resources for a user specified segment on a target device in response to user specified routing constraints specifying one of a specific wire and a category of wires on the target device, and that selects routing resources for a non-user specified segment on the target device without utilizing the user specified routing constraints.

10. The system designer of claim 9, further comprising a system designer interface unit that generates a routing constraints file that includes user specified routing constraints for routing a system on the target device.

11. The system designer of claim 9, wherein the routing unit comprises an ordering unit that orders segments such that segments having user specified routing constraints are routed before segments not having user specified routing constraints.

12. The system designer unit of claim 9, wherein the routing unit comprises a parsing unit that identifies erroneous user specified routing constraints.

13. The system designer of claim 12, wherein the parsing unit discards the identified erroneous user specified routing constraints from consideration prior to selecting routing resources.

14. The system designer of claim 9, wherein the category of wires describe an orientation of wires.

15. The system designer of claim 9, wherein the category of wires describe a length of wires.

16. A non-transitory computer readable medium including a sequence of instructions stored thereon for causing a computer to execute a method comprising:
   selecting routing resources for a user specified segment on a target device in response to user specified routing constraints specifying one of a specific wire and a category of wires on the target device;
   selecting routing resources for a non-user specified segment on the target device without utilizing the user specified routing constraints; and
   ordering segments such that segments having user specified routing constraints are routed before segments not having routing constraints.

17. The non-transitory computer readable medium of claim 16, wherein the method further comprises generating a routing constraints file that includes user specified routing constraints for routing a system on the target device.

18. The non-transitory computer readable medium of claim 16, wherein selecting routing resources for the user specified segments comprises ordering segments such that segments having user-specified routing constraints are routed before segments not having user-specified routing constraints.

19. The non-transitory computer readable medium of claim 16, wherein the method further comprises identifying erroneous user-specified routing constraints.

20. The non-transitory computer readable medium of claim 19, further comprising discarding identified erroneous user-specified routing constraints from consideration prior to selecting routing resources.

\* \* \* \* \*